United States Patent
Braun et al.

(10) Patent No.: US 11,409,649 B2
(45) Date of Patent: Aug. 9, 2022

(54) REMOVABLE DIRECT ATTACHED STORAGE FOR VEHICLE ENTERTAINMENT SYSTEMS

(71) Applicant: Panasonic Avionics Corporation, Lake Forest, CA (US)

(72) Inventors: Peter Braun, Foothill Ranch, CA (US); Melvin Lahip, Foothill Ranch, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 524 days.

(21) Appl. No.: 15/876,549

(22) Filed: Jan. 22, 2018

(65) Prior Publication Data
US 2019/0227922 A1 Jul. 25, 2019

(51) Int. Cl.
G06F 13/40 (2006.01)
G06F 12/02 (2006.01)
G06F 13/42 (2006.01)

(52) U.S. Cl.
CPC ...... *G06F 12/0246* (2013.01); *G06F 13/4022* (2013.01); *G06F 13/4081* (2013.01); *G06F 13/4282* (2013.01); G06F 2212/2146 (2013.01); G06F 2212/7207 (2013.01); G06F 2213/0026 (2013.01)

(58) Field of Classification Search
CPC ............ G06F 12/0246; G06F 13/4022; G06F 13/4081; G06F 13/4282; G06F 2212/2146; G06F 2212/7207; G06F 2213/0026
USPC ....................................................... 710/302
See application file for complete search history.

(56) References Cited

U.S. PATENT DOCUMENTS

| 8,126,147 | B2 | 2/2012 | Farley et al. |
| 8,659,990 | B2 | 2/2014 | Petrisor et al. |
| 9,043,846 | B2 | 5/2015 | Cline et al. |
| 9,967,595 | B1* | 5/2018 | Provost ............. H04N 21/2146 |
| 2007/0136504 | A1* | 6/2007 | Wu ..................... G06F 13/4081 710/302 |
| 2008/0147937 | A1* | 6/2008 | Freimuth ............ G06F 13/4022 710/104 |

(Continued)

OTHER PUBLICATIONS

Avago Technologies_2012 (Avago Optical PCIe Gen 3 Using MiniPOD Optical Moduels, https://www.youtube.com/watch?v=HvFmJhQOIgw&feature=youtu.be, Feb. 1, 2012).

*Primary Examiner* — Titus Wong
(74) *Attorney, Agent, or Firm* — Perkins Coie LLP

(57) ABSTRACT

A data storage interconnect system has a network controller with a first expansion bus switch connected to a central processor over an expansion bus interface thereof, and a first transceiver connected to the first expansion bus switch. A directly attachable storage host with a second transceiver is communicatively linked to the first transceiver of the network controller. A second expansion bus switch is connected to the second transceiver, and is connectable to a removable storage device over an expansion bus interface. The removable storage device communicates with the second expansion bus switch over an expansion bus protocol. A data transmission link interconnects the first transceiver and the second transceiver, with expansion bus protocol data traffic between the first expansion bus switch and the second expansion bus switch being carried thereon.

19 Claims, 6 Drawing Sheets

(56) References Cited

U.S. PATENT DOCUMENTS

| | | | |
|---|---|---|---|
| 2010/0162326 A1* | 6/2010 | Bonar | B64D 11/0023 725/77 |
| 2012/0116615 A1* | 5/2012 | Farley | H04B 7/18502 701/3 |
| 2012/0174165 A1* | 7/2012 | Mondragon | H04N 21/2146 725/75 |
| 2013/0063612 A1* | 3/2013 | Royster | H04N 21/43632 348/207.99 |
| 2013/0174265 A1* | 7/2013 | Chan | G06F 12/1408 726/26 |
| 2015/0074665 A1* | 3/2015 | Kamino | G06F 13/4027 718/1 |
| 2016/0147697 A1* | 5/2016 | Arroyo | G06F 9/44505 710/104 |
| 2016/0344792 A1* | 11/2016 | Sinivaara | H04N 21/43637 |

* cited by examiner

REMOVABLE DIRECT ATTACHED STORAGE FOR VEHICLE ENTERTAINMENT SYSTEMS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to data networking and entertainment systems for transportation vehicles, and more particularly to removable direct attached storage for vehicle entertainment systems.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Airlines equip service aircraft with in-flight entertainment and communications (IFEC) systems as an accommodation to its customers. Although the specific installation may vary depending on the service class, each passenger seat is equipped with a display device, an audio output modality, an input modality such as a remote control, and a terminal unit. Generally, the terminal unit may generate video and audio signals, receive inputs from the remote control, and execute pre-programmed instructions in response thereto. The display device is typically an LCD screen that is installed on the seatback of the row in front of the passenger, though in some cases it may be mounted to a bulkhead or retractable arm or the like that is in turn mounted to the passenger's seat. Furthermore, the audio output modality is a headphone jack, to which a headphone, either supplied by the airline or by the passenger, may be connected.

Via the display and the audio outputs, a wide variety of multimedia content can be presented to the passenger. Recently released movies are a popular viewing choice, as are television shows such as news programs, situation and stand-up comedies, documentaries, and so on. Useful information about the destination such as airport disembarking procedures, immigration and custom procedures and the like is also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger using the remote control, which may also have alternative uses, namely, for navigating through the vast multimedia content library and making selections thereof for viewing and/or listening. Thus, the terminal unit may also include a content selection application with a graphical user interface, through which such navigation of the content library is possible. The foregoing types of programming that can be presented to the passenger via the in-flight entertainment system will henceforth be generally referred to as content.

The content is encoded and stored as digital data, with a video decoder and audio decoder of the terminal unit functioning to generate the aforementioned video and audio signals therefrom. It is desirable to have a wide range of different content to satisfy the varying tastes of passengers. It is also desirable to have a sufficient volume of content so that passengers can remain occupied with entertainment for the entire duration of the flight. Accordingly, the content stored onboard the aircraft can range in the hundreds of gigabytes, if not over a terabyte. The majority of the data comprises the video programming, although the audio and video game content may be significant as well.

There are various ways in which to configure the storage and delivery system of content data. In many conventional configurations, content data is not stored on each individual terminal unit, but rather, in a central content server also onboard the aircraft. These may be referred to as server centric, and the terminal unit is understood to incorporate networking modalities such as Ethernet to establish data communications with the central content server. Once a particular selection of content is requested by the passenger via the content selection application, the terminal unit may retrieve the same from the central content server, decode the data, and present it to the passenger. Server-centric systems may, on occasion, become inaccessible for passengers. Redundancies for communication paths and server systems have been proposed to improve availability. Alternatively, data may be stored on each individual terminal unit, with such systems being referred to as seat-centric. Although not reliant on a server, the terminal units typically do not have the capabilities of a server, and have far less storage capacity. A hybrid system that provides advantages of both server and seat centric systems have been proposed, including that disclosed in U.S. Pat. App. Pub. No. 2015/0382027, the underlying application of which is co-assigned to Panasonic Avionics Corporation and is hereby incorporated by reference in its entirety. Such a hybrid system may utilize a virtual local storage in which content data is partially stored across multiple terminal units.

As important as variety and volume may be in regards to the content, novelty is as important for airlines to keep its passengers engaged with the in-flight entertainment system, particularly for valuable frequent fliers. Thus, regardless of whether the system is server-centric, client-centric, or hybrid, the content must be frequently updated. Due to the large volume of data involved, a portable content loader that is generally comprised of a hard disk drive, an optical drive, or a solid state drive loaded with the update data is physically carried onboard while the aircraft is on the ground and connected to the central content server. A download or copy process is then initiated, and once complete, the portable content loader is disconnected and removed from the aircraft.

In part because of the laborious manual procedures involved, this update process typically takes place on a monthly schedule, preferably during a layover between flights, such as when aircraft maintenance is conducted. It would be desirable for new multimedia content to be made available on a more frequent basis, incorporating programming that may be only days or even a few hours old. Yet, the expense and labor involved with the use of specialized content loader devices may preclude this. These issues are particularly acute for large fleets of aircraft.

Accordingly, there is a need in the art for replacing conventional portable content/media loaders and onboard media loaders. There is also a need for eliminating the requirement of portable media loaders that must be attached, and remain attached to the vehicle while a data transfer/upload is completed, prior to departure. There is a need in the art for removable direct attached storage for vehicle entertainment systems.

BRIEF SUMMARY

Removable direct attached storage devices and systems are set forth in the present disclosure. Such devices may replace portable media loaders and onboard media loaders by directly attaching mass storage to the in-flight entertainment system of aircraft. Various embodiments may incorporate a solid state drive removably connectible to a network controller of the in-flight entertainment system. These embodiments may extend the expansion bus lines of the network controller via fiber optic transmission modalities, such that the solid state drive to appear to the network controller as a directly attached storage media.

The various embodiments of the disclosure helps reduce the cost of the network controller by removing the mass storage and instead offering additional storage as an upgradeable option. More frequent and incrementally smaller updates are supported via high-speed connectivity options accessible from the front panel, including USB 3.1 ports and/or inserts or trays supporting memory card modules. Thus, significant advantages with respect to scaling to different storage requirements are contemplated, and not limiting the configuration of servers to those of specific storage sizes that may be too large or too small for different aircraft operators. Furthermore, power consumption may be reduced based upon the use of a management controllers in the directly attached storage to permit bidirectional communications therewith without additional communication interfaces that otherwise require additional processor resources. Flexibility with respect to the installation location is envisioned, as fiber optic cables may extend to an electronics/equipment bay or an overhead compartment that is located beyond short distances that otherwise limit other connectivity modalities. Such locations include co-location with the crew terminal in the video control cabinet, as well as the electronics/equipment bay, next to the network controller.

The direct attached storage device may be hot-plugged into the network controller, so the stored data may be immediate available. Accordingly, wait times associated with data transfers may be eliminated or reduced. In virtual local storage or single head end configurations, upload times are significantly reduced, while in aircraft configurations utilizing a content server, the directly attached storage still uploads data thereto. Yet, the directly attached storage device can remain with the aircraft and even be connected to the in-flight entertainment system for the duration of the flight, without the need for the maintenance technician to be onboard to retrieve the device. This may reduce the time for an aircraft maintenance technician to remain on the aircraft, decreasing turnaround times between flights when refreshing media content. To the extent additional cost savings are desired, the direct attached storage device may be removed or gracefully ejected after the media content is transferred, freeing it for use with transferring other media content to other aircraft or vehicles.

One embodiment of the present disclosure contemplates a data storage interconnect system. The system may have a network controller including a central processor with an expansion bus interface. The network controller may include a first expansion bus switch connected to the central processor over the expansion bus interface thereof. Additionally, the network controller may include a first transceiver connected to the first expansion bus switch. The system may also include a directly attachable storage host with a second transceiver communicatively linked to the first transceiver of the network controller. The directly attachable storage host may include a second expansion bus switch connected to the second transceiver. The second expansion bus switch may be connectable to a removable storage device over an expansion bus interface of the second expansion bus switch. The removable storage device may communicate with the second expansion bus switch over an expansion bus protocol. The system may also include a data transmission link that interconnects the first transceiver and the second transceiver. Expansion bus protocol data traffic between the first expansion bus switch and the second expansion bus switch may be carried on the data transmission link.

Another embodiment of the present disclosure is a direct attached storage device connectable to a network controller of a vehicle entertainment system. The device may include an optical transceiver with a transceiver input and a transceiver output connectable to respective optical transmission lines of a fiber optic pair. There may be an expansion bus switch connected to the optical transceiver and including a first expansion bus interface. The device may also include a removable storage host with a second expansion bus interface. The removable storage host may be connected to the expansion bus switch over an expansion bus link between the first expansion bus interface and the second expansion bus interface. The removable storage host may communicate with the expansion bus switch over an expansion bus protocol.

Yet another embodiment may be a network controller for connecting to a directly addressable storage device for a vehicle entertainment system. The network controller may include a central processor with an expansion bus interface. There may also be an expansion bus switch connected to the central processor over the expansion bus interface thereof. Furthermore, there may be a retimer connected to the expansion bus switch. The network controller may also include a local optical transceiver with a transceiver input and a transceiver output connectable to respective optical transmission lines of a fiber optic pair. The optical transceiver may be connected to the retimer, and the local optical transceiver may be receptive to expansion bus protocol data carried on the optical transmission lines originating from a remote removable storage host selectively connectible to a storage device.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of removable direct attached storage systems utilized in connection with entertainment systems installed in aircraft and other vehicles. This description is not intended to represent the only form in which the embodiments of the disclosed invention may be developed or utilized. The description sets forth the functions and features in connection with the illustrated embodiments, which are contemplated to provide fast, flexible, and scalable data storage and data loading operations in various aircraft configurations. It is to be understood that the same or equivalent functions may be accomplished by different embodiments that are also intended to be encompassed within the scope of the present disclosure. It is further understood that the use of relational terms such as first and second, local and remote, and the like are used solely to distinguish one from another entity without necessarily requiring or implying any actual such relationship or order between such entities.

Figure 1:
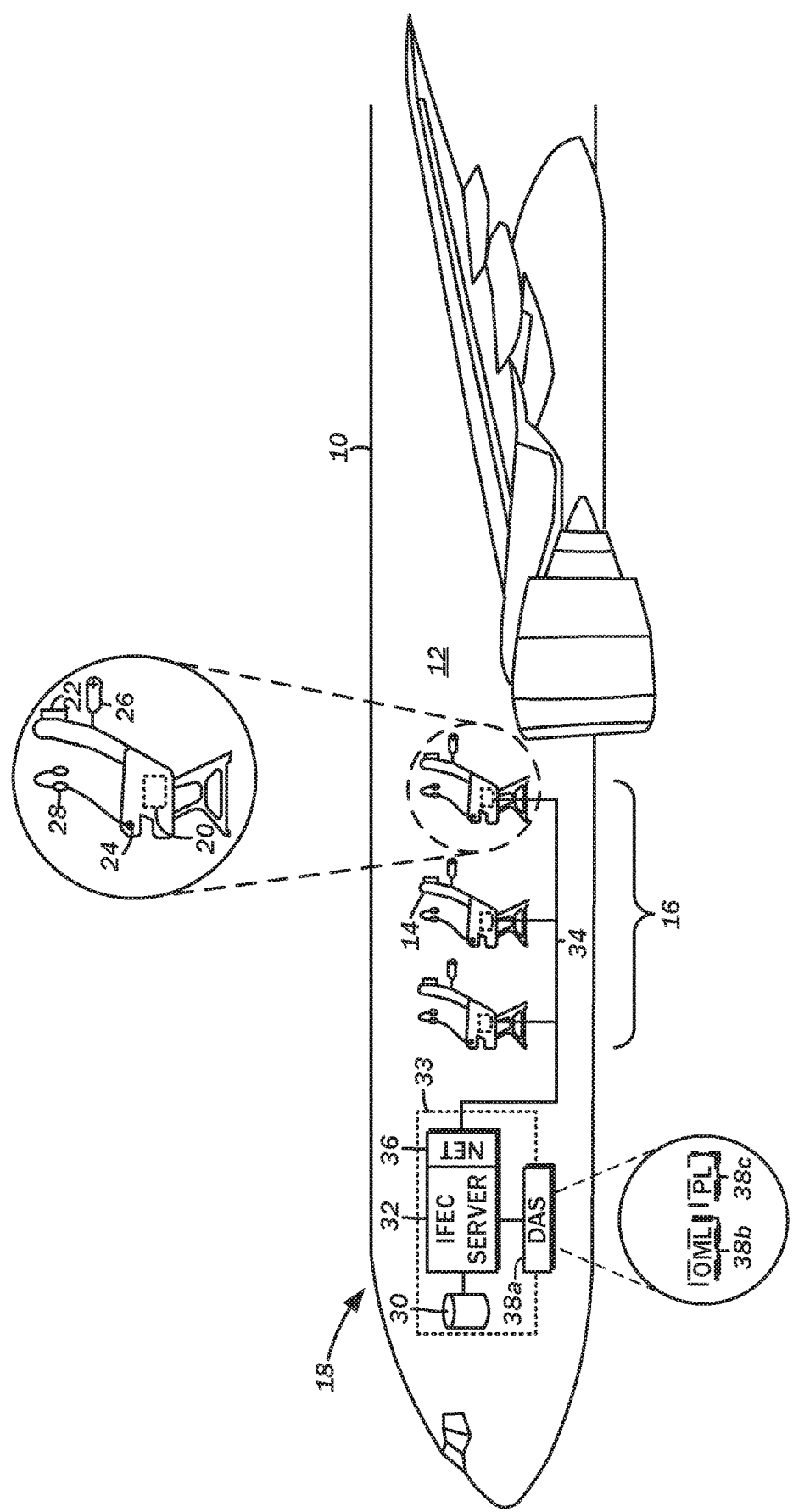
FIG. 1 is a diagram illustrating an aircraft in which the presently disclosed removable direct attached storage system may be deployed.

The diagram of FIG. 1 depicts an exemplary passenger aircraft 10 in which various embodiments of the presently disclosed wireless content loader may be implemented. Within a fuselage 12 of the passenger aircraft 10 there are seats 14 arranged over multiple rows 16, and each seat 14 accommodating a single passenger. Although the features of the present disclosure will be described in the context of the passenger aircraft 10 and amenities therefor, other passenger vehicles such as trains, watercraft, buses, and others utilizing integrated entertainment systems may be substituted.

The passenger aircraft 10 incorporates an in-flight entertainment and communications (IFEC) system 18, through which various entertainment and connectivity services may be provided to passengers while onboard. A typical IFEC system 18 includes individual seat-back modules comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. This is by way of example only, and other display 22 and remote controller 26 mounting and access configurations such as a retractable arm or the like mounted to an armrest of the seat 14 or by mounting on a bulkhead.

The display 22 is understood to be a conventional liquid crystal display (LCD) screen with a low profile that is suitable for installation on the seatback. Each passenger can utilize an individual headset 28, supplied by either the airline or by the passenger, which provides a more private listening experience. In the illustrated embodiment, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including three sockets or a standard audio output without noise canceling. In alternate embodiments, each display 22 may incorporate a terminal unit 20 to form a display unit referred to in the art as a smart monitor.

A common use for the terminal unit 20 installed on the aircraft is the playback of various media content. The terminal unit 20 may be implemented with a general-purpose data processor that decodes the data files corresponding to the media content and generates video and audio signals for the display 22 and the audio output 24, respectively. This media content may include movies, television shows, such as news programs, comedy, documentaries, and informational content pertinent to the flight destination. Furthermore, media content may also encompass audio-only programming, as well as interactive games, flight progress mapping, flight status displays, newspapers/magazines readable on the display 22, and so on. Broadly, media content is intended to refer to any content of varying duration and form that can be presented to the passenger via the display 22 or the audio output 24, or a combination thereof.

The data files of the media content may be stored in a data store 30 associated with the IFEC system 18. Specifically, the data store 30 and is connected to and managed by an IFEC server 32, which may be a specifically adapted general purpose computer system configured as a server to provide data in response to requests therefor. The IFEC server 32 may use LINUX, but other operating systems could be used as well, such as WINDOWS. The IFEC server 32 may also be referred to in the art as a head end server. In this regard, although only one IFEC server 32 may be shown, in different deployments, there may be more than one. Typically, the IFEC server 32 is installed in the electronics and equipment (EE) bay 33 segregated from the passenger cabin, or a video control cabinet (VCC, not shown). Various software modules are understood to be incorporated into the IFEC server 32, including a streaming server that retrieves the media content from the data store 30, as well as a cataloging/menu application with which the user interacts to select the desired media content.

In addition to storing the data of the media content in the data store 30, it is also possible to distribute the data to a series of terminal units 20 in the aircraft, each of which include local content storage. Retrieval of the data for playback is understood to involve querying adjacent terminal units 20 until an accessible copy is identified. This may be referred to as a virtual local storage, which is described in further detail in U.S. Pat. App. Pub. No. 2015/038207 as described and incorporated by reference in its entirety above.

The passenger can play games being executed on the terminal unit and otherwise interact with the media content with the remote controller 26. Navigating through the vast multimedia content library and selecting ones for viewing and/or listening is also possible with the remote controller 26, though in some embodiments, a touch-screen display may be provided for a more intuitive interaction with the media content library. In either case, the terminal unit 20 is loaded with a content selection software application that is executed by the data processor and accepts input from the remote controller 26 or other input modality and generates a response on the graphical interface presented on the display 22. The terminal unit 20 may utilize an operating system based on ANDROID. However, other operating systems could be used, such as LINUX or proprietary operating systems available from Microsoft Corporation of Redmond, Wash. or Apple Inc. of Cupertino, Calif., which respectively sell operating systems under the trademarks of WINDOWS and IOS. The foregoing software applications may be specific to the selected operating platform.

Each of the terminal units 20 may be connected to the IFEC server 32 over an aircraft local area network 34, one segment of which may preferably be Ethernet. Thus, the IFEC server 32 includes a data communications module 36, which may be an Ethernet network interface card. Wireless local area networks may also be established within the cabin for personal electronic devices such as smart phones, tablets, laptop computers and the like to connect to the IFEC server 32, or to a satellite Internet connection, the details of which have been omitted for the sake of brevity.

The disclosed arrangement of the IFEC system 18, along with its constituent components, are presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

Various modalities for providing access to the media content via the IFEC system 18 are contemplated. The data for the media content may be stored in the data store 30, stored across the local storage of the terminal units 20 as in a virtual local storage configuration, and may otherwise made accessible via the IFEC server 32. One embodiment contemplates a direct attached storage (DAS) 38a in which a single head end server system is configured for virtual local storage. Another embodiment contemplates an onboard media loader (OML) 38b for incrementally loading media content data to dual head end server system. Still another embodiment contemplates a portable loader 38c for initial bulk media upload, though it is also possible to perform incremental uploads. While different applications are contemplated for each embodiment, these various embodiments may be referenced generally as a removable direct attached storage 38.

Figure 2:
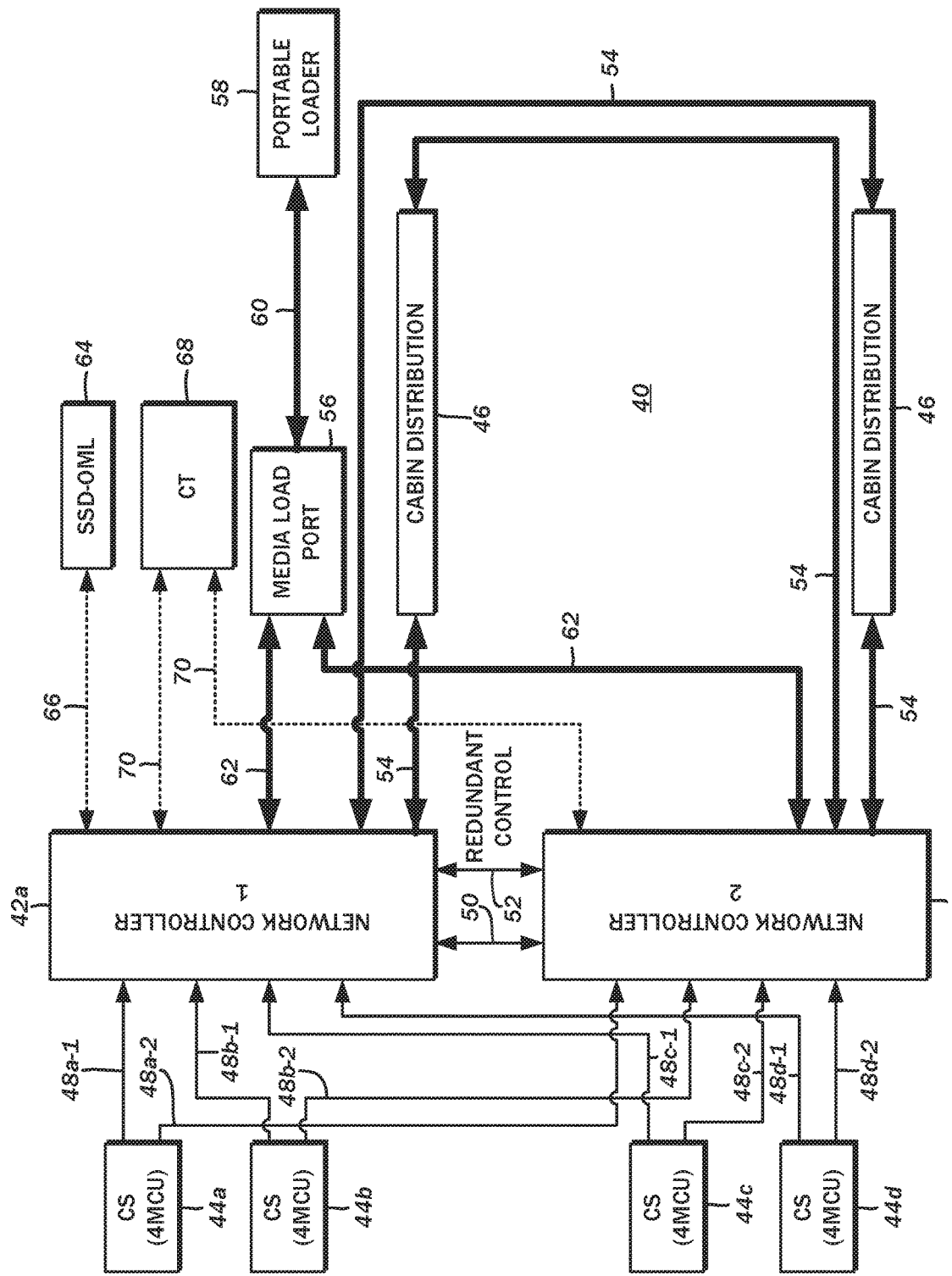
FIG. 2 is a block diagram illustrating a redundant head-end architecture in which various embodiments of the present disclosure may be implemented.

Embodiments of the removable direct attached storage 38 may be utilized in a redundant head-end architecture 40 such as that shown in FIG. 2. As considered above, the head-end is understood to correspond to the IFEC server 32 that provides data networking modalities, file storage and management, and generally controls the delivery of content to the terminal units 20. In further detail, the redundant head-end architecture 40 is so referenced because there is a first network controller 42a and a second network controller 42b. Generally, the network controllers 42 interconnect the content servers (CS) 44 to cabin distribution 46, which is understood to include the aircraft local area network 34 and the terminal units 20 interconnected thereby.

By way of example, there are four content servers 44a, 44b, 44c, and 44d, each of which are understood to be standalone computer systems with various processor configurations. Each of the content servers 44 may be housed in an ARINC (Aeronautical Radio, Incorporated) 600-compliant 4MCU package, and further, connected to both the first network controller 42a and the second network controller 42b. As illustrated, the first content server 44a is connected to the first network controller 42a via a connection 48a-1, while also being connected to the second network controller 42b via a connection 48a-2. The second content server 44b is connected to the first network controller 42a via a connection 48b-1 and also to the second network controller 42b via a connection 48b-2. The third content server 44c is connected to the first network controller 42a via a connection 48c-1 and to the second network controller 42b via a connection 48c-2. Further, the fourth content server 44d is connected to the first network controller 42a via a connection 48d-1 and to the second network controller 42b via a connection 48d-2. According to one embodiment, the connections 48a-1, 48a-2, 48b-1, 48b-2, 48c-1, 48c-2, 48d-1, and 48d-2 are each 10 gigabit links, e.g., 10 GBase-SR.

The first network controller 42a is communicatively linked with the second network controller 42b. In this regard, there is a connection 50 that may be, for example, a 10 to 40 gigabit link, preferably implemented as a fiber optic link. There is also a redundant control connection 52 as between the first network controller 42a and the second network controller 42b.

Both the first network controller 42a and the second network controller 42b may be independently connected to the cabin distribution 46, which includes the aforementioned terminal units 20 interconnected with the aircraft local area network 34; the connection thereto is illustrated in FIG. 2 as multiple connections 54 to the first network controller 42a and the second network controller 42b. In one exemplary embodiment, the connections 54 may be a 10 gigabit link, e.g., 10 GBase-SR, carried over a fiber optic cable.

Additionally, the redundant head-end architecture may include a media load port 56 to which a portable content loader 58 may be connected. It is understood that the portable content loader 58 includes a data storage device, and content data may be stored thereon. So that the content servers 44 have new content to deliver to the passengers, the data on the portable content loader 58 may be updated from time to time, and brought onto the aircraft during regular maintenance or between layovers. Once connected, the data on the portable content loader 58 may be copied to the content servers 44. A connection 60 established between the portable content loader 58 and the media load port 56 may be a 10 gigabit link carried over fiber optic cable, as is a connection 62 between the media load port 56 and the first and second network controllers 42a, 42b. Aside from the content loaded via the portable content loader 58, data may be stored on a solid state drive onboard media loader 64. A connection 66 established between the network controllers 42a, 42b and the onboard media loader 64 may be, for example, a 2.5 gigabit link.

Various management tasks, as well as monitoring the performance and operation of the redundant head-end architecture 40, may be performed by crewmembers via a crew terminal 68. A connections 70 established between respective first and second network controllers 42a, 42b are each understood to be a 2.5 gigabit link, though this is by way of example only and not of limitation.

Figure 3:
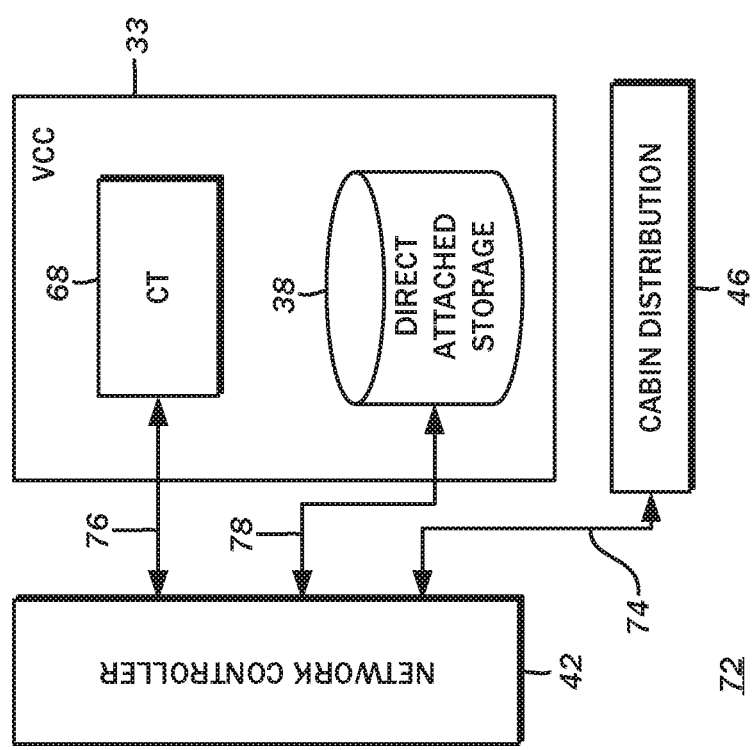
FIG. 3 is a block diagram illustrating a single head-end architecture in which various embodiments of the present disclosure may be implemented.

FIG. 3 is a block diagram showing a single head end architecture 72, with a single network controller 42. In further detail, the network controller 42 is connected to the cabin distribution 46 over a connection 74. In an exemplary embodiment, the connection 74 may be a 10 gigabit link.

Like the redundant head-end architecture 40, there is a crew terminal 68 in communication with the network controller 42 over a connection 76. Again, the connection 76 may be a 2.5 gigabit link, though this is exemplary only (exemplary as used herein means by way of example and not as necessarily the best way). Additionally, in accordance with various embodiments of the present disclosure, there is a direct attached storage 38 connected to the network controller 42 over a connection 78. As will be explained in further detail below, the connection 78 may be a PCIe (Peripheral Components Interconnect Express) high speed expansion bus link that is carried over fiber optic. The crew terminal 68, as well as the direct attached storage 38, may be located at a video control cabinet or the electronics and equipment bay 33, and may be separated from the network controller 42. This configuration is contemplated to reduce power consumption of the network controller 42, as the power needed for the storage device is offloaded. Additionally, because use of the high speed data link is contemplated, upload of media content, whether during initial uploads or during incremental updates, is envisioned to be minimal in duration. Data transfer speeds of 6.4 gigabits per second are contemplated. The storage capacity is understood to be scalable, as storage devices available in 2 terabyte, 4 terabyte, 8 terabyte, 16 terabyte, and 32 terabyte sizes may be utilized. The offloading of the data storage from the network controller 42 is contemplated to achieve substantial cost reductions, as additional storage need be added only to the extent needed.

Figure 4:
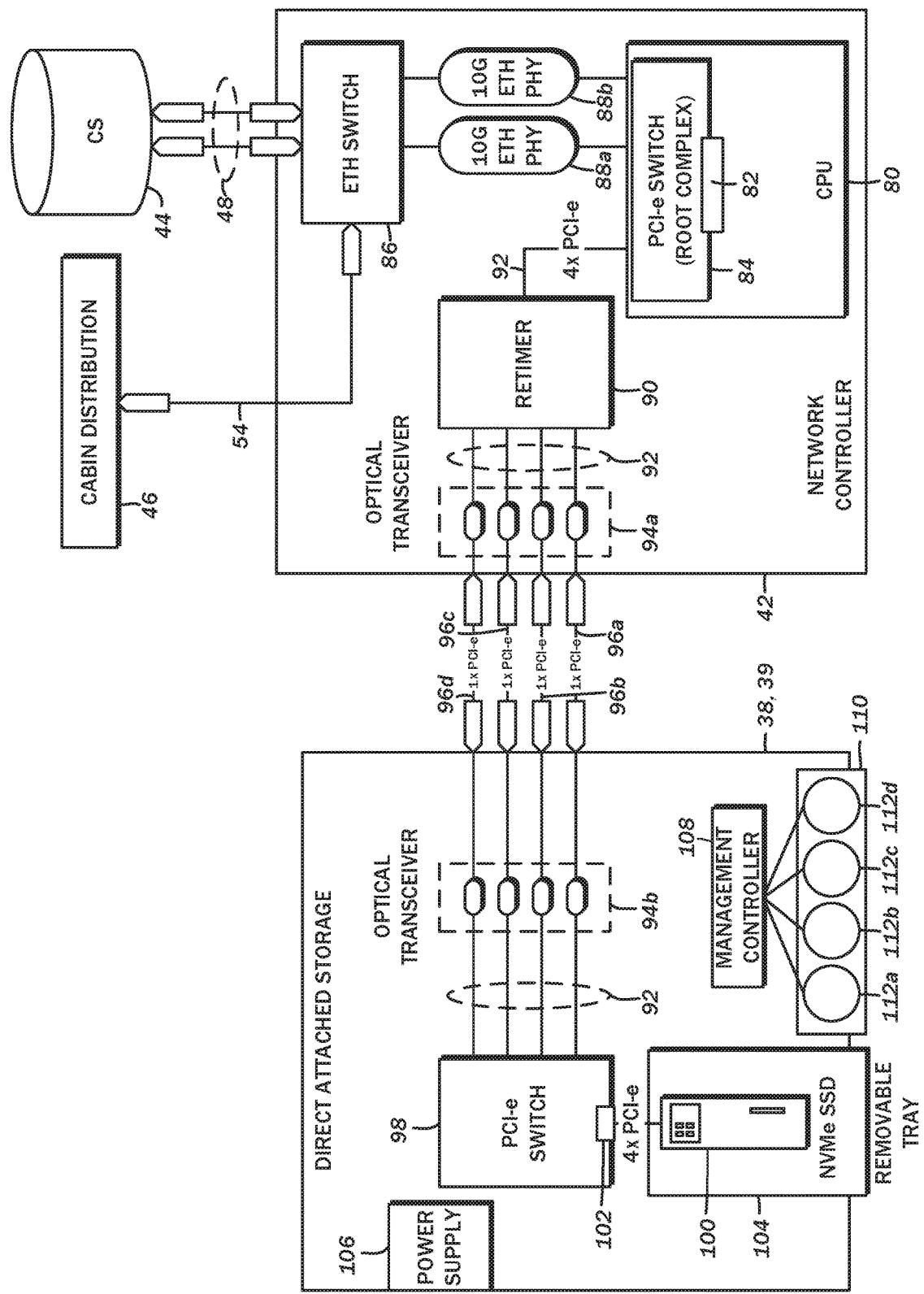
FIG. 4 is a detailed block diagram of the removable direct attached storage system of the present disclosure.

With reference to the block diagram of FIG. 4, additional details of the removable direct attached storage system will be considered. Broadly, the system is contemplated to replace portable media loaders and onboard media loaders by directly attaching mass storage to the IFEC system 18. According to one embodiment, there is a particular configuration of a network controller 42 which includes a central processor 80. Although any suitable central processor 80 may be utilized, in one embodiment, it is an x86-family with multiple (or quad) cores. Although not depicted in FIG. 4, the network controller 42 may include random access memory (RAM), preferably 32 gigabytes or more.

The central processor 80 is understood to include an expansion bus interface 82, which in a preferred, though optional embodiment, is a PCIe (Peripheral Components Interconnect Express) expansion bus root complex. As will be recognized by those having ordinary skill in the art, the expansion interface hardware, including card/connector dimensions, pinouts, and so forth, are standardized and conform to the PCIe standard. Likewise, the electrical signaling and data transmissions (at the data link and transaction layers) are also standardized and conform to the PCIe standard.

Either integral with or separate from the central processor 80 is a first expansion bus switch 84 that connects to the expansion bus interface 82, which represents one endpoint in the expansion bus. The first expansion bus switch 84 is understood to allow the connection of downstream peripheral devices to the single endpoint of the expansion bus interface 82, and effectively permits the addition of further endpoints.

In the illustrated embodiment, the first expansion bus switch 84 is connected to an Ethernet switch 86 over an Ethernet physical layer connection 88. In further detail, there is a first Ethernet physical layer connection 88a that may have a link speed of 6.4 gigabits per second, and a second Ethernet physical layer connection 88b that may have a link speed of 12.8 gigabits per second. The physical layer throughput is understood to approach 20 gigabits per second, but the destination, e.g., the content server, may have a maximum write speed of 12.8 gigabits per second. The reduced throughput of these links may restrict the overall speed of the removable direct attached storage system, even though certain data transfer links therein may exceed such speed limitations. The Ethernet switch 86 is connected to the aforementioned cabin distribution 46 over the aircraft local area network 34, as well as the content server 44. Various embodiments contemplate a 10 gigabit link between the Ethernet switch 86 and the cabin distribution 46 over the connection 54. Multiple Ethernet links may be utilized to interconnect the Ethernet switch 86 and the content server 44, with each being a 10 gigabit link. As discussed above, the connections 48 between the content server 44 and the network controller 42 may be fiber optic, and have a throughput of over 12.8 gigabits per second. Reference to Ethernet herein is by way of example only, and any other suitable high-speed data networking modality may be readily substituted. In this regard, the Ethernet switch 86 may be referred to more generally as a local area network interface.

The first expansion bus switch 84 is also connected to an expansion bus retimer 90 over an expansion bus link 92. The PCIe standard defines a physical link as being comprised of multiple lanes, with each lane including two differential signaling pairs. There is one pair for received signals, and another pair is for transmitting signals. In a preferred, though optional embodiment, there is a four-lane (4×) link interconnecting the first expansion bus switch 84 and the expansion bus retimer 90. The PCIe standard also defines the data link layer and the transaction layer, and thus data transmissions over the expansion bus is understood to conform to the standards therefor, and may be referred to as expansion bus protocol data traffic.

It will be recognized by those having ordinary skill in the art that the expansion bus retimer 90, particularly one that is configured for use with the PCIe expansion bus, is an active signal conditioner with a clock data recovery circuit which retimes the transmitter output to a reference clock. With the use of a retimer, the signal of PCIe signal over the fiber link can be ensured, and synchronize the timing between the network controller 42 and the directly attached storage 38 that otherwise have different clock domains.

Each lane of the expansion bus link 92 is connected to a separate transmit and receive ports of a first transceiver 94a. The direct attached storage 38, which may also be referred to as a host or a direct attached storage host 39, is understood to include a counterpart second transceiver 94b that is communicatively linked with the first transceiver 94a over a data transmission link 96. As utilized in this context, the reference to "second," e.g., the second transceiver 94b, is used solely to distinguish from the first transceiver 94a of the network controller 42, and does not imply there is a "first" transceiver otherwise incorporated into the direct attached storage host 39.

Preferably, though optionally, the data transmission link 96 is fiber optic, so the corresponding transceivers 94 employing the data transmission link 96 are understood to be optical transceivers. The signals exchanged by the transceivers are accordingly optical as well. Both the first transceiver 94a and the second transceiver 94b may be, by way of example, small form-factor pluggable transceivers. One lane of the expansion bus link 92 may be carried by a pair of optical fiber; for a four-lane PCIe expansion bus link 92, there may be four pairs of optical fibers, including a first fiber pair 96a, a second fiber pair 96b, a third fiber pair 96c, and a fourth fiber pair 96d. The throughput of the data transmission link 96 is understood to be sufficient for accommodating the expansion bus protocol data traffic. Each fiber pair 96a-96d is understood to include a first fiber for transmit, and a second fiber for receive, with each connection having a throughput of 5 gigabits per second. The bi-directional (read/write) throughput of the data transmission link 96 with four fiber pairs may be, for example, 20 gigabits per second (4×5 gigabits per second).

The direct attached storage host 39 also includes a second expansion bus switch 98 that is connected to the second transceiver 94b. Again, like the first expansion bus switch 84 of the network controller 42, the second expansion bus switch 98 defines a further endpoint of the expansion bus. It is also noted that the "second" expansion bus switch 98 is so referenced only to distinguish the same from the first expansion bus switch 84 incorporated into the network controller 42, and is not intended for there to be a "first" expansion bus switch in the direct attached storage host 39.

In one embodiment, the endpoint as defined by the second expansion bus switch 98 may be utilized to selectively connect a removable storage device 100. This connection is made over an expansion bus interface 102 of the second expansion bus switch 98. In accordance with one embodiment of the direct attached storage host 39, the removable storage device 100 is an NVMe (Non-Volatile Memory Express) compliant solid state drive (SSD). It will be recognized that NVMe is a device interface standard/specification, though any other type of storage device interconnect standard or modality may be substituted. One implementation of the removable storage device 100 envisions write speeds of 3-4 gigabits per second, and read speeds of 20 gigabits per second. However, a removable storage device 100 of any other performance level may also be employed. In accordance with the NVMe specification, hot-plugging of the removable storage device 100, that is, attaching the removable storage device 100 while the host and the network controller 42 are active and operational, and the removable storage device 100 being immediately recognized and accessible without substantial interruption, is contemplated.

The physical and logical interface of the removable storage device 100, particularly as it connects to the expansion bus is still PCIe, so any data transmissions are understood to conform to the bus expansion protocol as defined by PCIe. Considering that the exemplary embodiment of the network controller 42 includes four PCIe lanes, a corresponding number of four PCIe lanes are envisioned for the expansion bus interface 102 of the second expansion bus switch 98 as well as the removable storage device 100. The data throughput of the link between the removable storage device 100 and the second expansion bus switch 98 may be approximately 22 gigabits per second in both read and write, based upon four 8 gigabits per second lanes. The removable storage device 100 may be disposed within a tray 104, and inserted and removed from an enclosure that houses the direct attached storage host 39.

The direct attached storage host 39 includes an independent power supply 106, which is contemplated to reduce the power consumption by the network controller 42. The power supply 106 may be connected to a 115V alternating current source, as well as a 28V direct current source. In some embodiments, the direct attached storage host 39 may be more than 100 meters away from the network controller 42, so there is substantial flexibility with respect to its installation location.

Although PCIe expansion busses are understood to have limited transmission distances, in accordance with various embodiments of the present disclosure, the expansion bus data traffic can be carried on the high-speed fiber optic data transmission link 96 over a greater distance. In this regard, the direct attached storage host 39, and in particular the removable storage device 100, effectively becomes an expansion peripheral of the network controller 42, that its, the removable storage device 100 is "directly attached" to the network controller 42. As discussed above, the direct attached storage host 39 may be installed in a video control cabinet or an electrical equipment bay, and existing fiber cable may be utilized. With such an embodiment, 40 G SWDM4 (Shortwave Wavelength Division Multiplexing) fiber modules may be utilized to provide the contemplated four lane PCIe link on a single fiber pair.

The direct attached storage host 39 also includes an independent management controller 108 that coordinates the operations of the components of the same, such as the second transceiver 94b, the second expansion bus switch 98, and the removable storage device 100. The management controller 108 may also monitor various sensors pertaining to the operation of the direct attached storage host 39, and report basic statuses via an indicator light panel 110. In an exemplary embodiment, the indicator light panel 110 may include a first light 112a for a power status, a second light 112b for a transceiver status, a third light 112c for a storage device locked status, and a fourth light 112d for storage device activity. This storage device activity may correspond to that of the removable storage device 100, as well as any other peripheral storage devices that are connectible to the direct attached storage host 39, as will be described in further detail below. Each of the lights 112a-112d may be light emitting diodes (LEDs), though any other suitable illumination device may be substituted.

Figure 5:
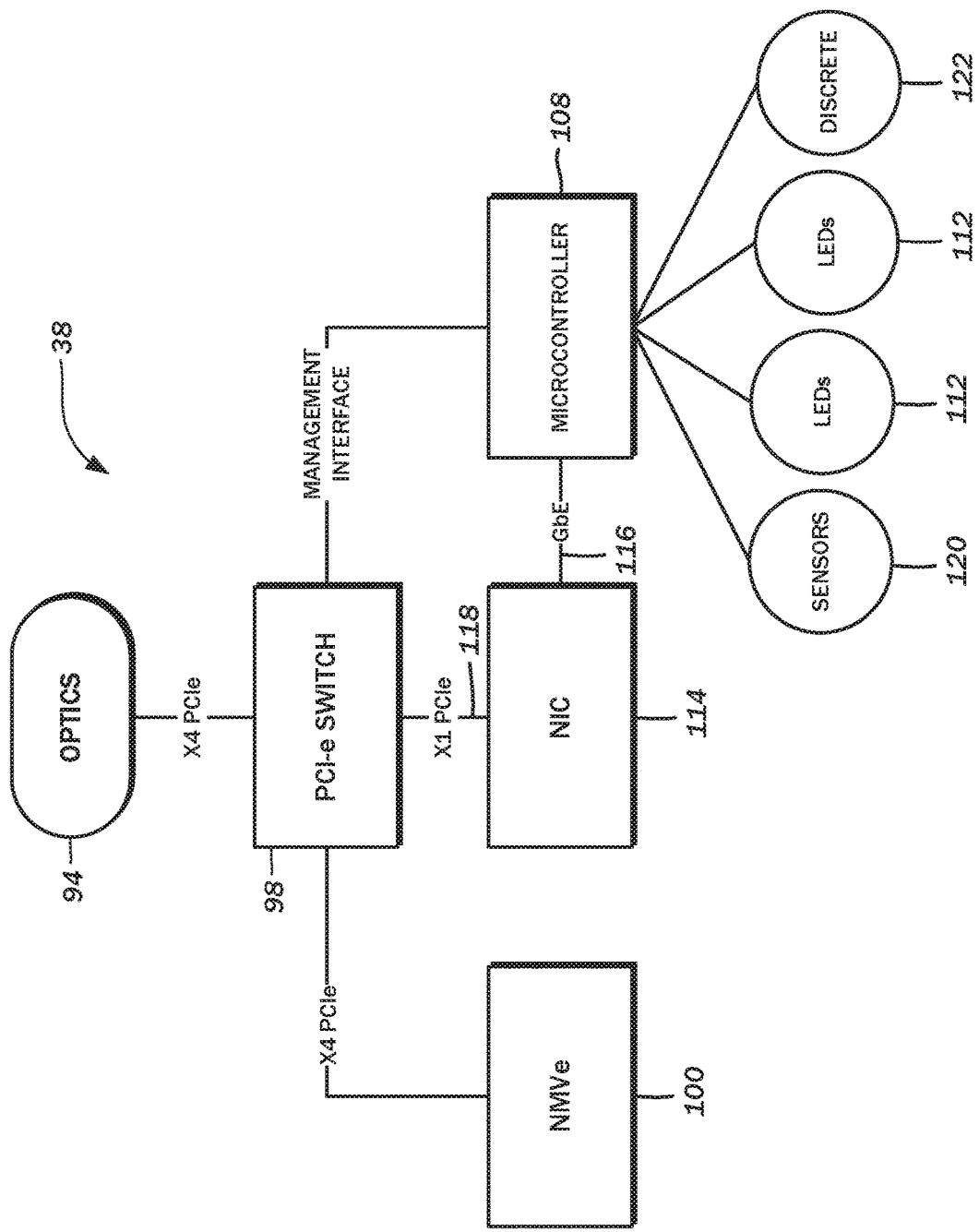
FIG. 5 is a block diagram showing the functional components of the removable direct attached storage system.

With reference now to the block diagram of FIG. 5, a more generalized embodiment of the direct attached storage host 39 will be considered. As discussed above, there is an optical transceiver 94 connected to an expansion bus switch/PCIe switch 98 that defines expansion bus endpoints for a removable storage device/NVMe 100, the management controller 108, and a network interface card 114. According to the illustrated embodiment, the management controller 108 is also connected to the network interface card 114 over a Gigabit Ethernet connection 116. The network interface card 114 is connected to the expansion bus switch/PCIe switch 98 over a single lane connection 118. Again, the management controller 108 is connected to the lights 112, as well as various sensors 120 and discrete devices 122.

The direct attached storage 38 is understood to communicate with the network controller 42 via the management controller 108, and provides the network controller 42 with telemetry data retrieved from the sensors 120. The management controller 108 is also understood to provide a management interface, via which the network controller 42 can control the configuration of the direct attached storage 38. Along these lines, the direct attached storage 38 may communicate directly with the network controller 42 without additional communications interfaces.

Figure 6A:
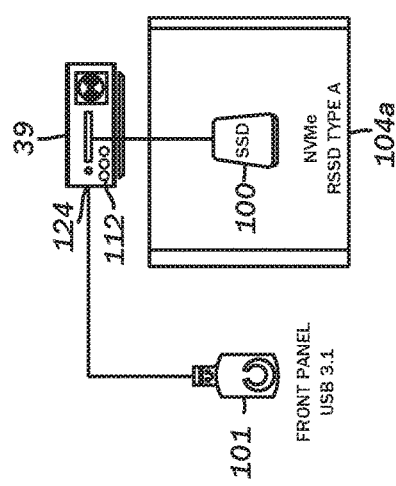
FIG. 6A is a block diagram showing another embodiment of the removable direct attached storage system including an input/output expansion allowing for the connection of another storage device.

The exemplary configuration of the direct attached storage 38 of FIG. 4 depicts a single NVMe solid state drive as the removable storage device 100, but this is by way of example only and not of limitation. Other embodiments of the present disclosure contemplate additional types of removable storage devices and removable storage device trays 104. Furthermore, a permanent serial interconnect port may also be incorporated into the direct attached storage host 39. With reference to the diagram of FIG. 6A, there is a USB (Universal Serial Bus) 3.x port 124, to which an USB removable memory device 101 may be connected. Incorporating the USB 3.x port 124 on the direct attached storage host 39 is understood to allow for faster upload speeds to the content server 44 or to the primary removable storage device 100 in a tray 104*a*, relative to connecting the same USB removable memory device 101 to a USB port on the crew terminal 68. Upload speeds of up to 3.5 gigabits per second are understood to be possible with USB 3.1-compliant devices. The front panel of the direct attached storage host 39 may include another indicator light 112 for access activity pertaining to a connected USB removable memory device.

Figure 6B:
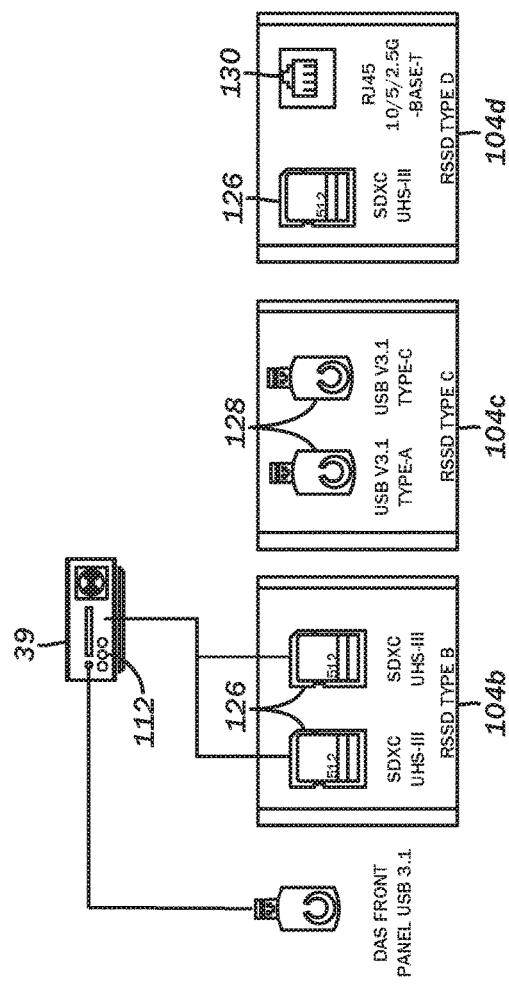
FIG. 6B is a block diagram of yet another embodiment of the removable direct attached storage system with additional options for connecting various storage devices.

Other configurations of the removable storage device 100 and trays 104 shown in FIG. 6B are envisioned to allow the carrier to select different storage options based on operational models and preferences, and may be referred to as a modular media input/output. In further detail, there is a second tray 104*b* that accommodates two SDXC (Secure Digital Extended Capacity) memory cards 126. These memory cards may conform to Ultra High Speed, Phase III bus design specifications, and the tray 104 as well as the direct attached storage host 39 is understood to incorporate corresponding memory card adapters with matching specifications, e.g., SDXC UHS-III. The second tray 104*b* may be readily inserted and removed from the direct attached storage host 39, and the memory cards 126 may likewise be readily attached and removed from the second tray 104*b*.

A third tray 104*c* may accommodate two USB-based memory devices 128. Preferably, as with the aforementioned USB 3.x port 124 on the face of the direct attached storage host 39, the corresponding internal ports are also understood to conform to the USB 3.1 standard, though the memory devices 128 may have a type-C connector.

A fourth tray 104*d* may accommodate a single SDXC memory card 126, and may also include an RJ-45 adapter/jack 130 for accepting 10 GBase-T, 5 GBase-T, and 2.5 GBase-T connections to other memory devices with such connection modalities. In this regard, the RJ45 adapter 130 may be located at the front faceplate of the tray 104, while the SDXC adapter is incorporated into the fourth tray 104*d*. Still other configurations for the tray 104 include one SDXC adapter and one USB 3.x port.

All of the foregoing trays 104*a*-104*d* are understood to have the same form factor that can be inserted into the direct attached storage host 39. Each tray 104 are envisioned to have a maximum power consumption of approximately 10 watts. In order to show access activity pertaining to each of the various storage devices, the front panel of the direct attached storage host 39 is understood to include the indicator light 112.

As discussed above, the removable direct attached storage 38 may be utilized in different configurations and purposes. One such contemplated configuration is as a direct attached storage for single head-end systems employing virtual local storage. The single head end architecture 72 is understood to provide mass storage for staging media content prior to cabin distribution 46. The removable direct attached storage 38*a* allows for the head-end storage to reside external to the network controller 42, which may reduce its power consumption. Additionally, the cost of the network controller 42 may be reduced by separating from the storage device and offering different capacities. As discussed above, the flexibility with respect to the installation site is possible.

Another contemplated configuration is as an onboard media loader in redundant head-end architecture 40. When thus used, the removable direct attached storage 38 may upload incremental data to the content server 44. New removable storage devices 100 may be preloaded with media content, and then inserted in the onboard media loader 38*b*. Again, the removable storage device 100 is understood to be hot-pluggable. In comparison to existing onboard media loader upload speeds, the direct attached storage 38 allows for higher throughout and reduce the amount of time before new media content is available for passenger consumption.

Yet another contemplated configuration is as a portable loader for initial bulk media content uploads. Incremental/periodic uploads are also possible. In this configuration, the removable direct attached storage 38 includes a high capacity removable storage device 100, and connects to the content server 44 via a high speed fiber optic Ethernet link. Depending on the size of the media library destined for the content server 44, the portable loader may be entirely replaced. With hot-plugging functionality, new data may be immediate available to the content server 44. The hot-plugged direct attached storage 38 may remain on the aircraft unlike conventional portable loaders that must be removed prior to aircraft departure. This is understood to reduce the time for a maintenance technician to be onboard the aircraft, decreasing aircraft turnaround between flights.

The particulars shown herein are by way of example only for purposes of illustrative discussion, and are presented in the cause of providing what is believed to be the most useful and readily understood description of the principles and conceptual aspects of the various embodiments of the removable direct attached storage systems utilized in connection with entertainment systems. In this regard, no attempt is made to show any more detail than is necessary for a fundamental understanding of the different features of the various embodiments, the description taken with the drawings making apparent to those skilled in the art how these may be implemented in practice.

What is claimed is:

1. A data storage interconnect system, comprising:
   a network controller interconnecting a content server of an in-flight entertainment and communications system (IFEC) of an aircraft to a local area network of the aircraft, the network controller including a central processor with an expansion bus interface, a first expansion bus switch connected to the central processor over the expansion bus interface thereof, and a first transceiver connected to the first expansion bus switch;
   a directly attachable storage host including a second transceiver communicatively linked to the first transceiver of the network controller, and a second expansion bus switch connected to the second transceiver, the second expansion bus switch being connectable to a removable storage device over an expansion bus interface of the second expansion bus switch, the removable storage device communicating with the second expansion bus switch over an expansion bus protocol; and
   a data transmission link interconnecting the first transceiver and the second transceiver, expansion bus protocol data traffic between the first expansion bus switch and the second expansion bus switch being carried on the data transmission link,
   wherein the network controller includes an ethernet switch that facilitates a first connection between the IFEC system and the content server and a second connection between the IFEC system and the directly attachable storage host, wherein the second connection is not routed through the content server, and
   wherein the removable storage device is hot-pluggable into the network controller to deliver media content from the removable storage device to the content server via the network controller while the network controller is active and operational in communicatively interconnecting the content server to the local area network of the aircraft.

2. The data storage interconnect system of claim 1, wherein the network controller includes an expansion bus retimer connected to the first expansion bus switch and the first transceiver.

3. The data storage interconnect system of claim 1, wherein:
the data transmission link is defined by a physical layer and a logical layer, the physical layer being optical fiber; and
the first transceiver and the second transceiver are optical transceivers transmitting and receiving optical signals.

4. The data storage interconnect system of claim 1, wherein the expansion bus interface is defined by one or more lanes of transmit and receive pairs.

5. The data storage interconnect system of claim 4, wherein a connection between the removable storage device and the second expansion bus switch has four lanes of transmit and receive pairs.

6. The data storage interconnect system of claim 4, wherein a data throughput of the data transmission link is greater than a combined data throughput of the lanes of transmit and receive pairs of the expansion bus interface.

7. The data storage interconnect system of claim 1, wherein:
the removable storage device is a solid state memory module; and
the directly attachable storage host includes a memory module adapter connected to the second expansion bus switch and receptive to the solid state memory module.

8. The data storage interconnect system of claim 1, wherein the directly attachable storage host includes a serial interconnect port receptive to a counterpart serial interconnect plug connectable to the removable data storage.

9. The data storage interconnect system of claim 1, wherein the expansion bus interface of the central processor and the expansion bus interface of the second expansion bus switch is a Peripheral Components Interconnect Express (PCIe) interface.

10. A direct attached storage device connectable to a network controller of a vehicle entertainment system, the device comprising:
an optical transceiver with a transceiver input and a transceiver output connectable to respective optical transmission lines of a fiber optic pair, the optical transmission lines being connected to a network controller interconnecting a content server of an in-flight entertainment and communications system (IFEC) of an aircraft to a local area network of the aircraft;
an expansion bus switch connected to the optical transceiver and including a first expansion bus interface; and
a removable storage host including a second expansion bus interface, the removable storage host being connected to the expansion bus switch over an expansion bus link between the first expansion bus interface and the second expansion bus interface, with the removable storage host communicating with the expansion bus switch over an expansion bus protocol,
wherein the network controller includes an ethernet switch that facilitates a first connection between the IFEC system and the content server and a second connection between the IFEC system and the directly attachable storage host, wherein the second connection is not routed through the content server, and
wherein the removable storage host is hot-pluggable into the network controller to deliver media content from the removable storage host to the content server via the network controller while the network controller is active and operational in communicatively interconnecting the content server to the local area network of the aircraft.

11. The direct attached storage device of claim 10, wherein the removable storage host is connectible to a data storage device.

12. The direct attached storage device of claim 11, wherein the data storage device is a solid state drive.

13. The direct attached storage device of claim 11, wherein the data storage device is a memory card.

14. The direct attached storage device of claim 10, further comprising:
a serial interconnect port receptive to a counterpart serial interconnect plug associated with a data storage device, the serial interconnect port being connected to the removable storage device host.

15. The direct attached storage device of claim 10, further comprising:
a microcontroller connected to the optical transceiver, the expansion bus switch, and the removable storage host, the microcontroller being programmed with executable instructions to coordinate operations of the optical transceiver, the expansion bus switch, and the removable storage host.

16. The direct attached storage device of claim 10, further comprising:
a power supply independent of the network controller and powering the optical transceiver, the expansion bus switch, and the removable storage host.

17. A network controller for connecting to a directly addressable storage device for a vehicle entertainment system, the network controller comprising:
a network switch interconnecting a content server of an in-flight entertainment and communications (IFEC) system of an aircraft to a local area network of the aircraft;
a central processor with an expansion bus interface;
an expansion bus switch connected to the central processor over the expansion bus interface thereof;
a retimer connected to the expansion bus switch; and
a local optical transceiver with a transceiver input and a transceiver output connectable to respective optical transmission lines of a fiber optic pair, the optical transceiver being connected to the retimer and the local optical transceiver being receptive to expansion bus protocol data carried on the optical transmission lines originating from a remote removable storage host selectively connectible to a storage device,
wherein the network controller includes an ethernet switch that facilitates a first connection between the IFEC system and the content server and a second connection between the IFEC system and the remote removable storage host, wherein the second connection is not routed through the content server, and
wherein the remote removable storage host is hot-pluggable into the network controller to deliver media content from the remote removable storage host to the content server via the network controller while the network controller is active and operational in communicatively interconnecting the content server to the local area network of the aircraft.

18. The network controller of claim 17, wherein the expansion bus interface is defined by one or more lanes of input and output pairs.

19. The network controller of claim 17, wherein the storage device is a solid state memory module and the remote removable storage host includes a memory module adapter.

* * * * *